United States Patent [19]

Sparrow et al.

[11] Patent Number: 5,180,549

[45] Date of Patent: Jan. 19, 1993

[54] NUCLEAR FUEL ASSEMBLY HAVING DOUBLE ENCLOSURE TOP NOZZLE SUBASSEMBLY

[75] Inventors: James A. Sparrow, Columbia; Robert W. Cantrell, Hopkins, both of S.C.

[73] Assignee: Westinghouse Electric Corp., Pittsburgh, Pa.

[21] Appl. No.: 736,359

[22] Filed: Jul. 26, 1991

[51] Int. Cl.⁵ ............................................. G21C 3/32
[52] U.S. Cl. .................................. 376/445; 376/446; 376/364
[58] Field of Search ............... 376/445, 446, 285, 364; 976/DIG. 103, DIG. 104, DIG. 63, DIG. 68

[56] References Cited

U.S. PATENT DOCUMENTS

| | | | |
|---|---|---|---|
| 4,646,415 | 3/1987 | Wilson et al. | 29/426 |
| 4,702,882 | 10/1987 | Stucker | 376/446 |
| 4,986,956 | 1/1991 | Sparrow et al. | 376/445 |
| 5,057,272 | 1/1991 | DeMario et al. | 376/446 |

Primary Examiner—Donald P. Walsh
Assistant Examiner—Meena Chelliah

[57] ABSTRACT

A double enclosure top nozzle subassembly for a nuclear fuel assembly includes an upper structure having a top plate and an outer depending peripheral sidewall enclosure, a lower structure having a lower adapter plate and an inner upstanding peripheral sidewall enclosure disposed below the top plate and within the outer sidewall enclosure. The outer and inner sidewall enclosures are slidably movable relative to one another as the top plate moves toward and away from adapter plate. A plurality of resiliently-yieldable biasing devices, such as leaf springs extend between and engage the top plate and lower adapter plate. Interengagable structure on the lower and upper edges of the respective outer and inner sidewall enclosures limit movement of the top plate and lower adapter plate away from one another so as to retain the outer and inner sidewall enclosures in sliding contacting relationship together. The leaf springs are movable between compressed and expanded states in response respectively to application and removal of a hold-down force on the upper structure in the direction of the lower structure for permitting and causing movement of the top plate toward and away from the adapter plate and thereby the top nozzle subassembly between compressed and expanded conditions.

22 Claims, 9 Drawing Sheets

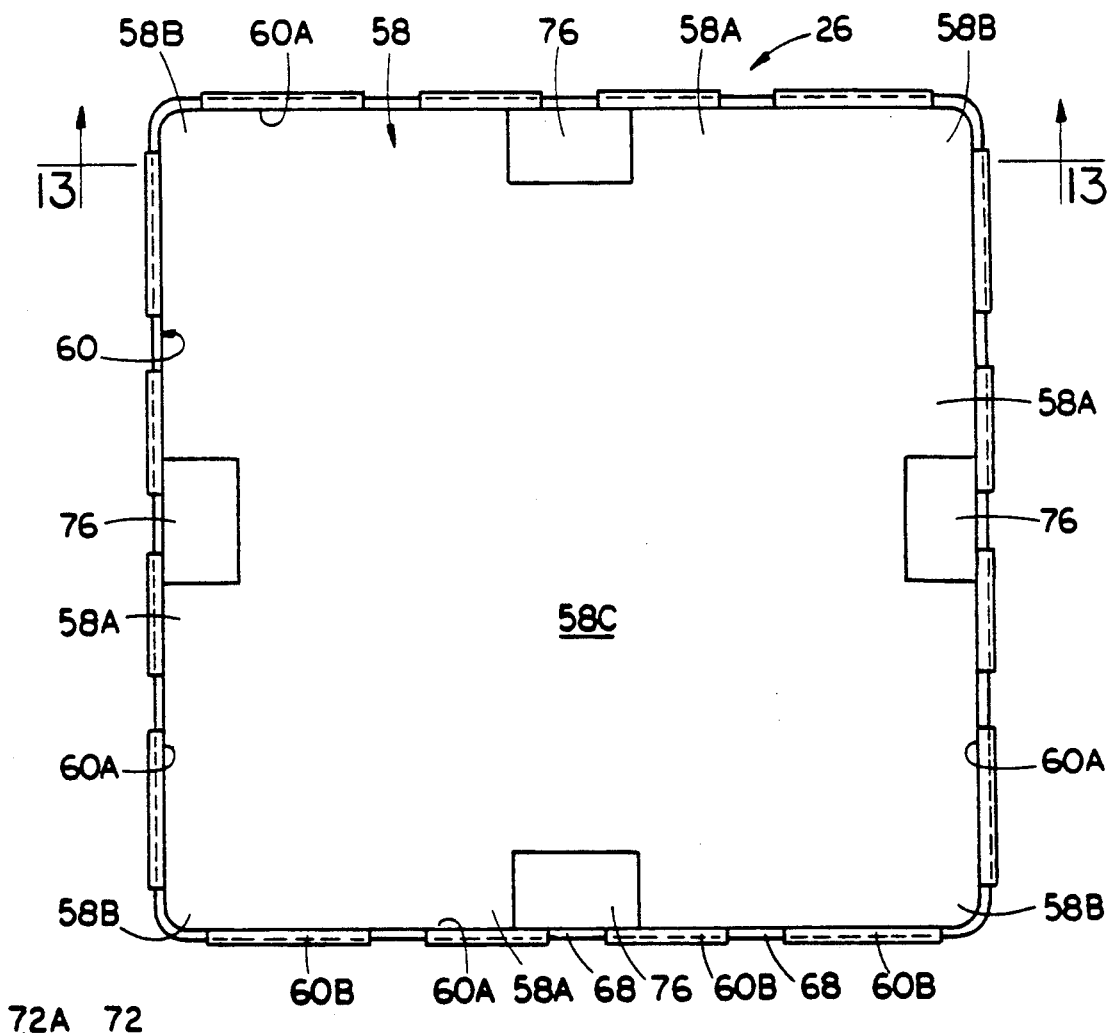
FIG. 12
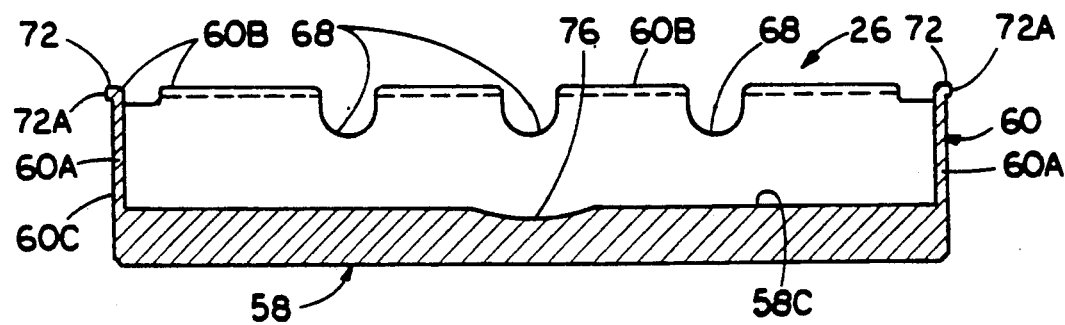
FIG. 14
FIG. 13

NUCLEAR FUEL ASSEMBLY HAVING DOUBLE ENCLOSURE TOP NOZZLE SUBASSEMBLY

CROSS REFERENCE TO RELATED APPLICATION

Reference is hereby made to the following copending application dealing with related subject matter and assigned to the assignee of the present invention: "Nuclear Fuel Assembly With Expandable Top Nozzle Subassembly" by James A. Sparrow et al, assigned to U.S. Pat. No. 4,986,959 May 17, 1989, now U.S. Pat. No. 4,986,959, issued Jan. 22, 1991.

BACKGROUND OF THE INVENTION

1. Field of the Invention

The present invention relates generally to fuel assemblies for nuclear reactors and, more particularly, is concerned with a double enclosure top nozzle subassembly allowing improved utilization of space for accommodating greater thermal growth and burnup of fuel rods of the fuel assembly.

2. Description of the Prior Art

In most nuclear reactors, the reactor core is comprised of a large number of elongated fuel assemblies which receive support and alignment from upper and lower transversely extending core support plates. The upper and lower core support plates are directly or indirectly attached to a support barrel which surrounds the entire core and extends between the ends thereof.

Conventional designs of these fuel assemblies include a plurality of fuel rods and control rod guide thimbles held in an organized array by a plurality of grids spaced along the fuel assembly length and attached to the control rod guide thimbles. The guide thimbles extend slightly above and below the ends of the fuel rods. Top and bottom nozzles on opposite ends of the fuel assembly are secured to the guide thimbles to thereby form an integral fuel assembly.

The fuel assemblies are arranged vertically resting on the lower core support plate. To facilitate handling and installation, the fuel assemblies are generally not secured to the upper and lower core support plates.

Temperatures at various times within the core may vary greatly, such as, from cold shutdown to normal operating conditions. Also, different materials exhibit different thermal growth characteristics. Since the materials of fuel assembly components are generally different than those used in the core support barrel and undergo greater thermal expansion, the resulting increase in length of the fuel assemblies in the axial or vertical direction must be accommodated. For this reason also, the fuel assemblies are not usually attached to the upper and lower core plates but rather are supported in a manner which permits some relative motion therebetween.

The axial thermal expansion differential between the fuel assemblies and the core support barrel has been accommodated by insuring that the axial spacing between the upper and lower core support plates is somewhat greater than the axial length of the fuel assemblies. Normally, this is accomplished by providing an axial gap between the top of the fuel assemblies and the upper core support plate. However, the presence of the gap can result in upward lifting of the fuel assemblies due to the hydraulic forces produced on the fuel assemblies in the upward direction by coolant flow. Thus, fuel assemblies have also employed hold-down devices with the top nozzles to prevent the force of upward coolant flow from lifting the fuel assemblies into damaging contact with the upper core support plate, while at the same time allowing for changes in fuel assembly length due to core-induced thermal expansion and the like. Representative to the prior art fuel assemblies with hold-down devices are those disclosed in Klumb et al U.S. Pat. No. 31,583, Anthony Pat. No. 4,078,967, Gjertsen et al U.S. Pat. No. 4,534,933, Wilson et al Pat. No. 4,620,960 and Wilson et al U.S. Pat. No. 4,670,213.

As mentioned previously, the guide thimbles of fuel assemblies extend slightly above and below the ends of the fuel rods. Thus, the top and bottom nozzles of fuel assemblies secured at the opposite ends of the guide thimbles likewise are spaced above and below the fuel rod ends. This space between the opposite ends of the fuel rods and adjacent portions of the top and bottom nozzles accommodates increase in length of the fuel rods due to thermal growth as fuel rod burnup occurs during normal reactor operation.

With improvements in various aspects of fuel assembly design, it has become feasible to increase the allowable burnup of the fuel rods. This increase in burnup is desirable because it decreases the frequency of plant shutdowns and the buildup of spent fuel. However, to permit the fuel rods to operate to a higher burnup, an increase of approximately 0.5 inch minimum in fuel rod length is necessary due to extra thermal growth. This necessitates an increase in the space between the adapter plates of the top and bottom nozzles to accommodate this additional fuel rod growth. At the same time, there still must be enough space between the top plate and adapter plate of the top nozzle to allow the handling equipment of the core to get between the plates and latch onto the underside of the top plate of the top nozzle.

Heretofore, there has not been enough room between the adapter plates of the top and bottom nozzles to permit the 0.5 inch growth in fuel rod length. A proposed solution to this problem is the expandable top nozzle subassembly of the above cross-referenced U.S. Pat. No. 4,986,959. This proposed design provides an extension of fuel assembly length sufficient to enable the fuel assembly to accommodate fuel rod growth in excess of one inch, allowing a reactor to operate at a higher burnup rate. Also, where extremely high burnups are not required, the mechanical duty of the fuel rods can be reduced significantly.

The proposed expandable top nozzle subassembly design of the cross-referenced application U.S. Pat. No. 4,986,959 makes use of "dead space" already existing in the conventional top nozzle between its top plate and bottom adapter plate. This space is characterized as "dead" since it is only used during installation and removal of the fuel assembly and not during operation of the core. The expandable (and compressible) top nozzle subassembly of the cross-referenced application U.S. Pat. No. 4,986,959 thus provides for the additional fuel rod growth space needed, while continuing to allow the use of current handling systems and thus eliminating potential costs to customers in design changes.

Basically, the expandable top nozzle subassembly of the cross-referenced application U.S. Pat. No. 4,986,959 includes a lower adapter plate, and an upper structure having a top plate and a sidewall enclosure rigidly connected to and depending from an outer peripheral edge of the top plate. The lower adapter plate is disposed below the top plate of the upper structure and within the sidewall enclosure thereof. The lower adapter plate and sidewall enclosure are slidably movable relative to one another so as to move the top plate away from and toward the lower adapter plate between expanded and compressed positions of the top nozzle subassembly.

When the expandable top nozzle subassembly is in the compressed position, the lower peripheral edge of the sidewall enclosure is disposed below the lower adapter plate and near the upper ends of the outermost ones of the fuel rods. The close proximity of the lower peripheral edge of the sidewall enclosure to the fuel rods has raised concern that contact will occur between them upon their vibration during reactor operation and result in fretting of the claddings of the fuel rods.

Consequently, a need still remains for an alternative design of a top nozzle that will accommodate extra fuel rod thermal growth while avoiding contact with the fuel rods and without impairing the handling capability of the core equipment currently in use.

SUMMARY OF THE INVENTION

The present invention provides a double enclosure top nozzle subassembly designed to satisfy the aforementioned needs. The double enclosure top nozzle subassembly of the present invention enables a fuel assembly to accommodate fuel rod growth in excess of one inch, allowing a reactor to operate at a higher burnup rate, by making use of "dead space" existing in the conventional top nozzle between its top plate and bottom adapter plate, as in the case of the expandable top nozzle subassembly of the cross-referenced application U.S. Pat. No. 4,986,959 while eliminating the potential problems of tube fretting associated therewith. In addition, leaf springs can be used instead of coil springs to eliminate concerns with respect to the potential problem of spring breakage.

Accordingly, the present invention is directed to a double enclosure top nozzle subassembly for a nuclear fuel assembly which permits increased fuel rod thermal growth and burnup. The double enclosure top nozzle subassembly comprises: (a) an upper structure including a top plate and an outer sidewall enclosure rigidly connected to and depending from an outer peripheral edge of the top plate; (b) a lower structure including a lower adapter plate and an inner sidewall enclosure rigidly connected to and upstanding from an outer peripheral edge of the lower plate, the lower adapter plate being disposed below the top plate and the inner sidewall enclosure being disposed within the outer sidewall enclosure, the inner and outer sidewall enclosures being movable in a sliding contacting relationship relative to one another as the top plate is moved toward and away from the lower adapter plate; (c) interengaging means on the respective upper and lower peripheral edges of the inner and outer sidewall enclosures for defining stops which limit the movement of the top plate and lower adapter plate away from each other so as to retain the outer and inner sidewall enclosures in the sliding contacting relationship with one another; and (d) a plurality of resiliently-yieldable biasing devices disposed within the inner and outer sidewall enclosures and extending between and engaging the top plate and the lower adapter plate, the devices being movable between compressed and expanded states in response respectively to application and removal of a hold-down force on the upper structure in the direction of the lower structure for respectively permitting and causing movement of the inner and outer sidewall enclosures relative to one another so as to move the top plate toward and away from the lower adapter plate and thereby the top nozzle subassembly between compressed and expanded conditions. Preferably, the top plate of the upper structure and the lower adapter plate of the lower structure are generally rectangular in configuration having four sides defining four corners.

More particularly, the top plate of the upper structure includes an annular body and the outer peripheral edge of the top plate is defined by a rim projecting outwardly from an upper peripheral edge of the annular body so as to define an annular cavity surrounding the annular body for receiving an upper peripheral edge of the outer sidewall enclosure. A plurality of indentations are defined along the periphery and underside of the annular body in spaced relation to one another. The indentations face outwardly of the body and downwardly therefrom. The portions of the body between the indentations form downwardly protruding tabs along the periphery of the body for attaching the top plate to the upper peripheral edge of the outer sidewall enclosure when received below the top plate rim by pins inserted through the upper peripheral edge of the outer sidewall enclosure and the tabs of the top plate.

Further, the inner sidewall enclosure of the lower structure has a plurality of upper edge portions spaced apart by notches being defined between them. The upper edge portions and the notches are capable of mating respectively with the spaced indentations and tabs in the top plate when the top nozzle subassembly is in the compressed condition.

Preferably, the biasing devices are a plurality of leaf springs movable between expanded and compressed states. Each leaf spring is disposed between the top plate and lower adapter plate. Each leaf spring has a generally U-shaped configuration and is composed of a lower bight portion and a pair of upper end portions. Each leaf spring is seated at its lower bight portion within a depression formed in the topside of the lower adapter plate along each of the sides and midway between the corners thereof and seated at its opposite upper end portions within a pair of guide grooves defined in the underside of the top plate along each of the sides and adjacent the corners thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 12 is a top plan view of an inner side wall enclosure and lower adapter plate of a lower structure of the double enclosure top nozzle subassembly of FIG. 2.

FIG. 13 is a sectional view of the inner enclosure as taken along line 13—13 of FIG. 12.

FIG. 14 is an enlarged fragmentary sectional view of the upper left portion of the inner enclosure as shown in FIG. 13.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 1:
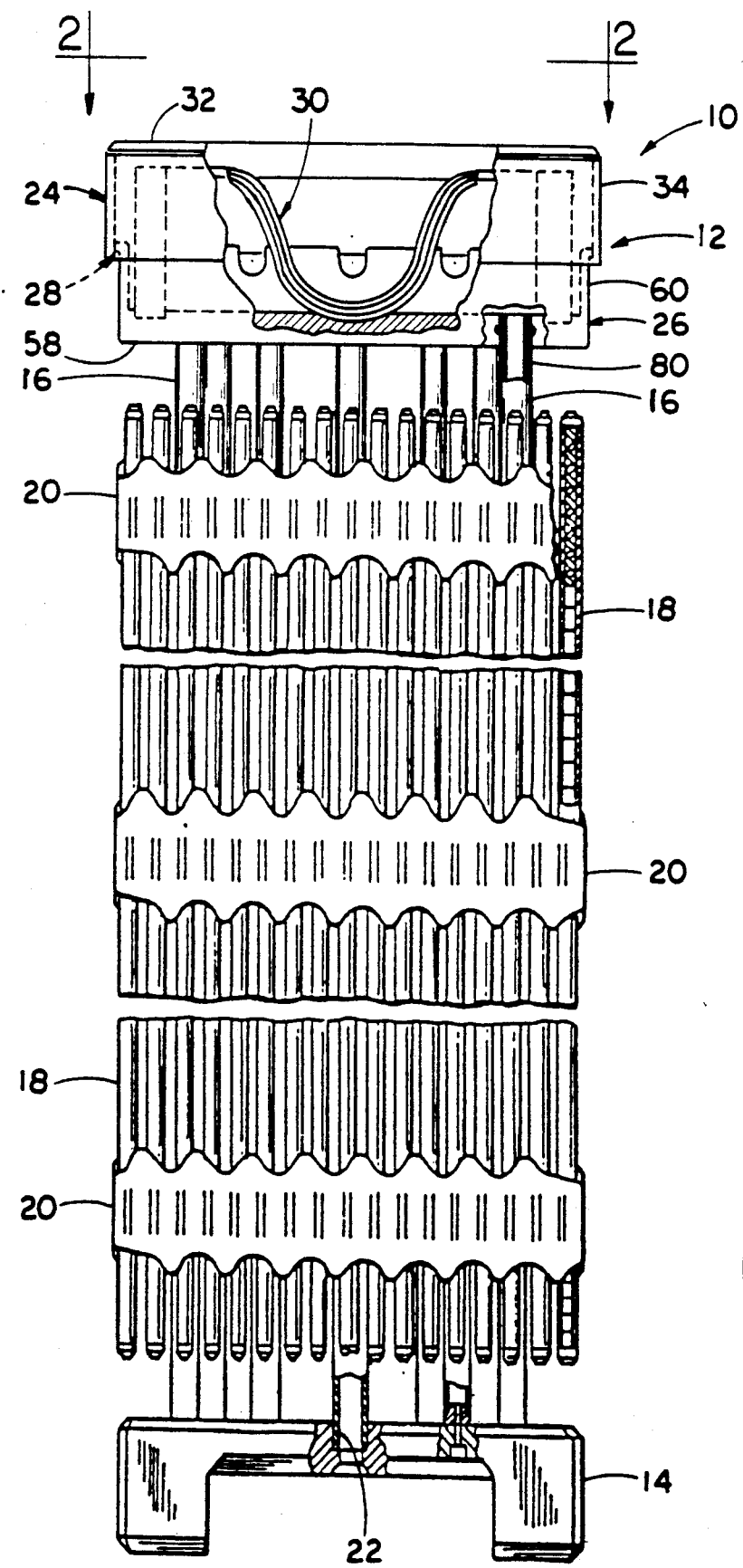
FIG. 1 is a partially sectioned elevational view, with parts being broken away for clarity, of a fuel assembly having a double enclosure top nozzle subassembly in accordance with the principles of the present invention.

Referring now to the drawings, and particularly to FIG. 1, there is shown a fuel assembly, generally designated by the numeral 10, having a double enclosure top nozzle subassembly 12 constructed in accordance with the principles of the present invention. In addition to the top nozzle subassembly 12, the fuel assembly 10 basically includes a bottom nozzle 14 for supporting the fuel assembly on the lower core support plate (not shown) in the core region of a nuclear reactor (not shown) and a number of longitudinally extending control rod guide tubes or thimbles 16 projecting upwardly from the bottom nozzle 14 and attached at their upper and lower ends to the top nozzle subassembly 12 and bottom nozzle 14. Further, an organized array of fuel rods 18 are held in spaced relationship to one another by a number of transverse grids 20 spaced along the fuel assembly length and attached to the guide thimbles 16. An instrumentation tube 22 is located at the center of the fuel assembly 10. The top nozzle subassembly 12, bottom nozzle 14 and guide thimbles 16 together form an integral assembly capable of being conventionally handled without damaging the assembly parts.

Figure 2:
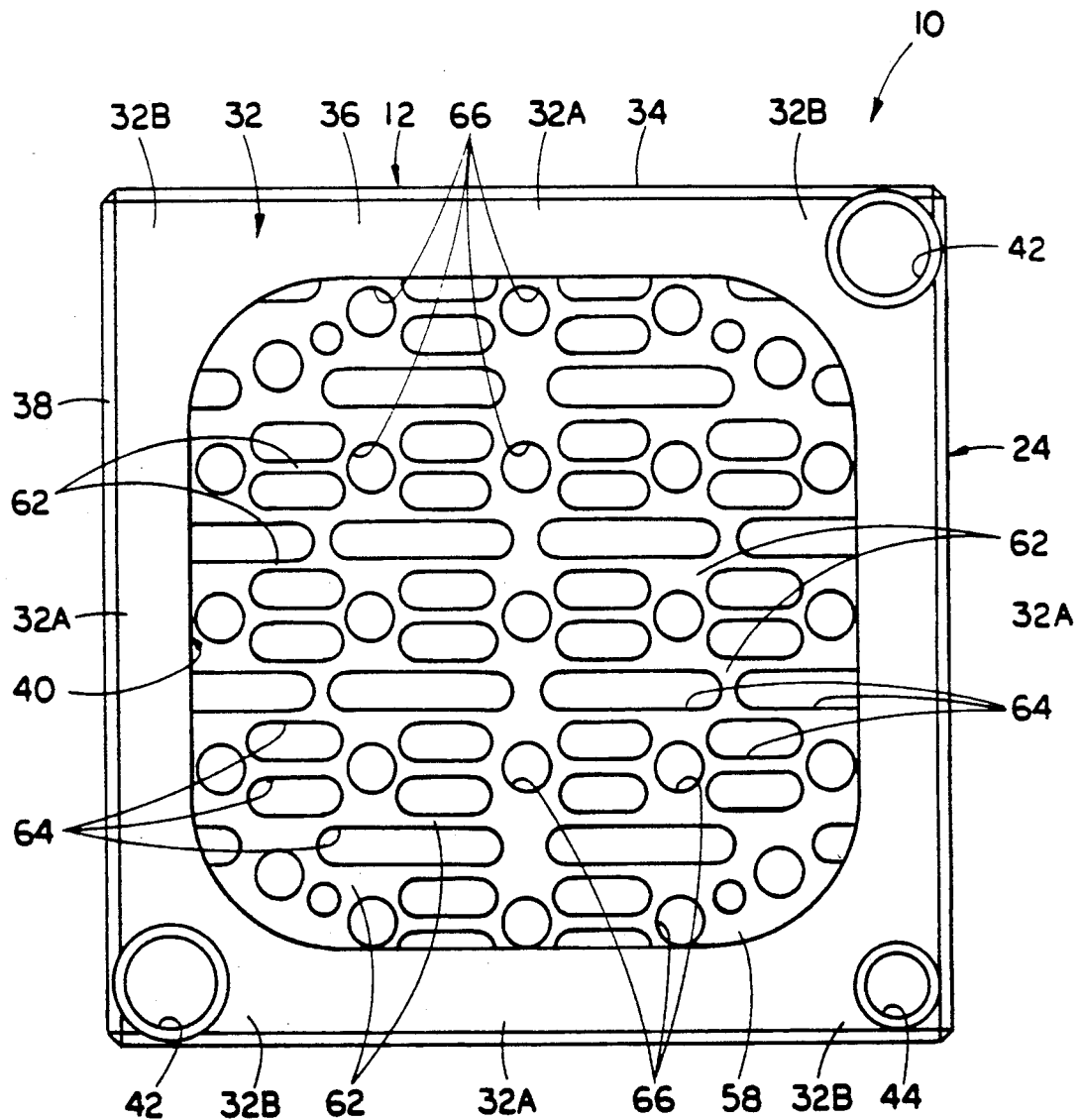
FIG. 2 is an enlarged top plan view of the fuel assembly as seen along line 2—2 of FIG. 1.
Figure 3:
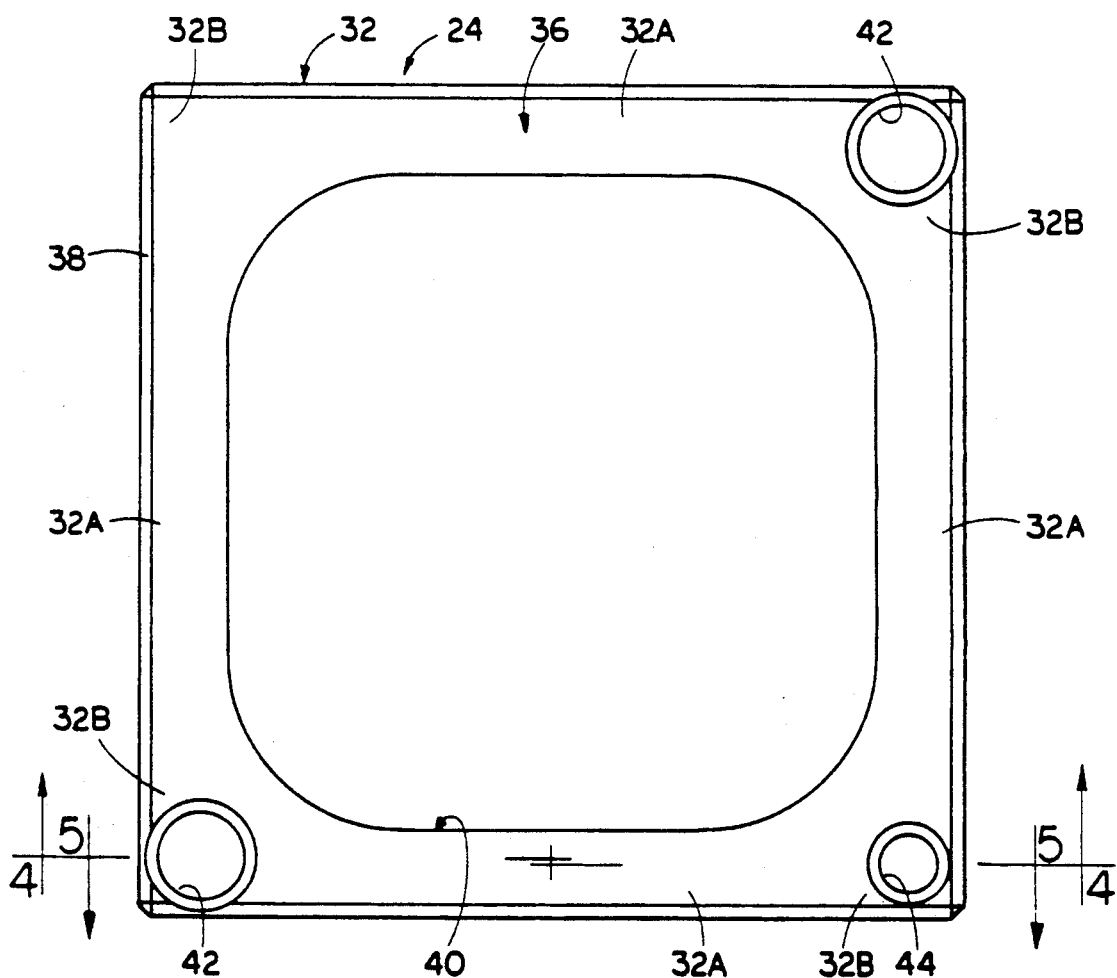
FIG. 3 is a top plan view of a top plate of an upper structure of the double enclosure top nozzle subassembly of FIG. 2.
Figure 4:
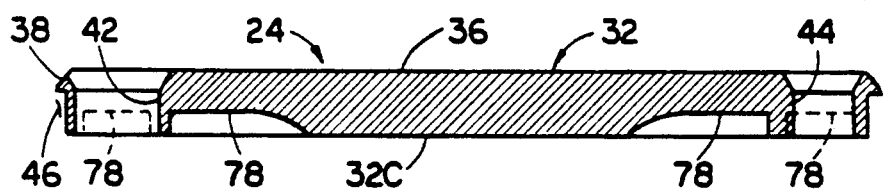
FIG. 4 is a sectional view of the top plate as taken along line 4—4 of FIG. 3.
Figure 5:
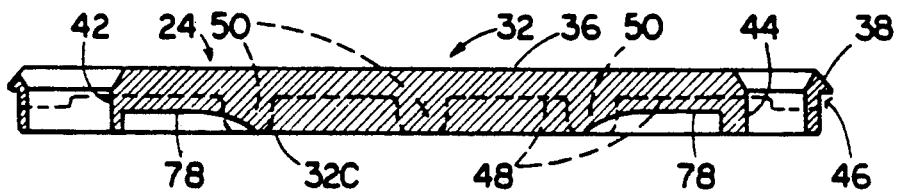
FIG. 5 is another sectional view of the top plate as taken along line 5—5 of FIG. 3.
Figure 6:
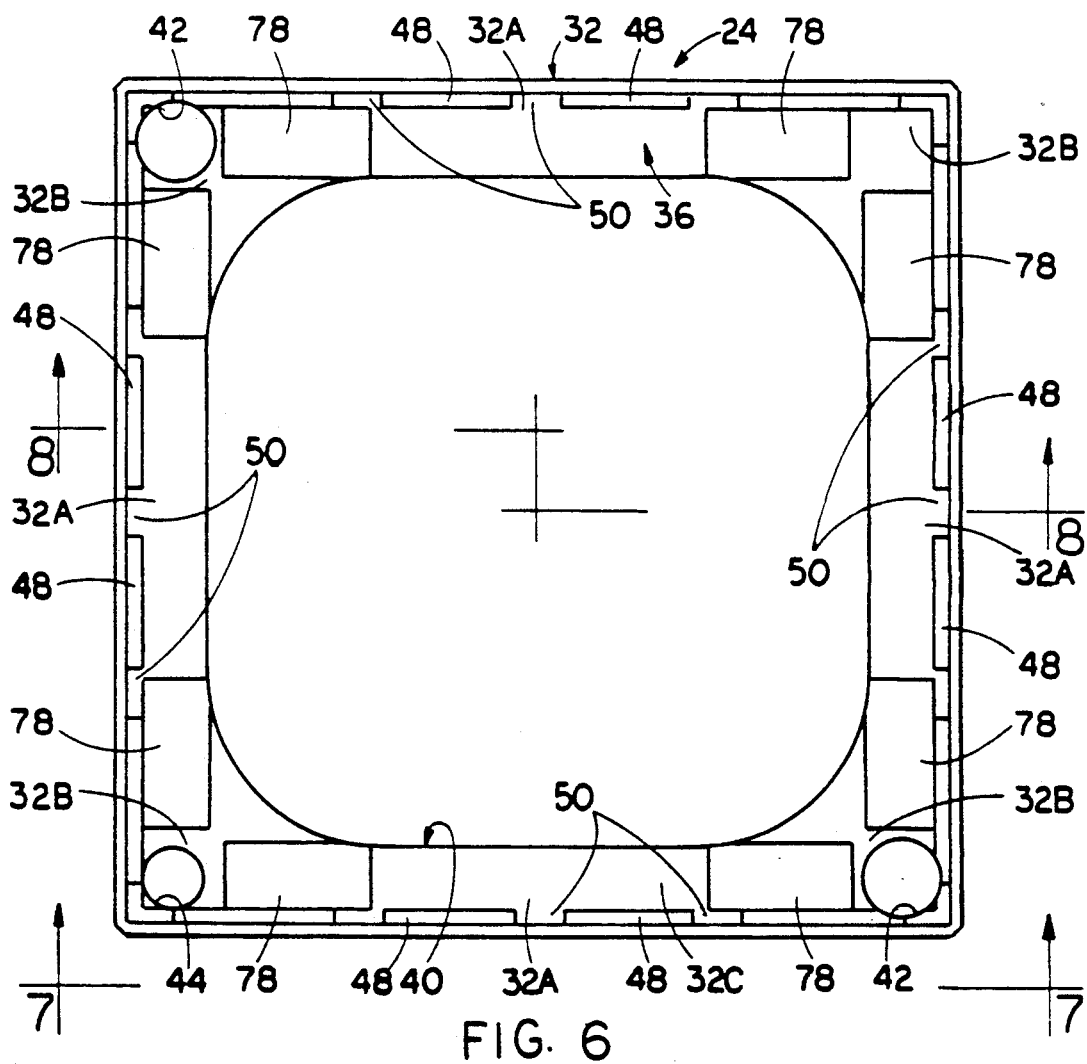
FIG. 6 is a bottom plan view of the top plate of the upper structure of the double enclosure top nozzle subassembly.
Figure 7:
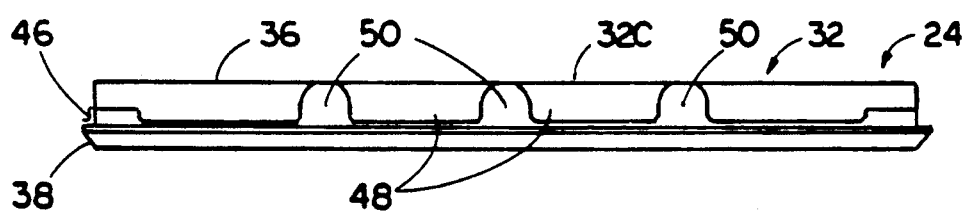
FIG. 7 is a side elevational view of the top plate as seen along line 7—7 of FIG. 6.
Figure 8:
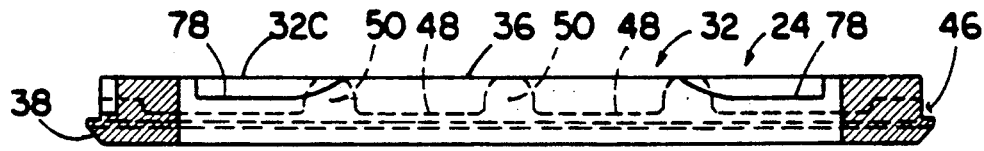
FIG. 8 is a sectional view of the top plate as taken along line 8—8 of FIG. 6.

Referring to FIGS. 1 and 2, the double enclosure top nozzle subassembly 12 of the present invention has a construction which permits improved utilization of space for accommodating greater thermal growth of fuel rods 18 of the fuel assembly 10 and higher fuel rod burnup. At the same time, the top nozzle subassembly 12 continues to allow the use of a conventional handling system for installing and removing the fuel assembly 10 in and from the reactor core. Basically, the top nozzle subassembly 12 includes an upper structure 24, a lower structure 26, interengaging means 28 on the lower and upper peripheral edges of the respective upper and lower structures 24, 26, and a plurality of resiliently-yieldable biasing devices 30 disposed between the upper and lower structures 24 26.

As shown alone and in greater detail in FIGS. 2-11, the upper structure 24 of the top nozzle subassembly 12 is composed of a top plate 32 and an outer sidewall enclosure 34 rigidly connected to and depending from the top plate 32. Referring to FIGS. 3-8, the top plate 32 is generally rectangular in configuration having four sides 32A defining four corners 32B. The top plate 32 includes an annular body 36 and an annular rim 38 integrally attached to and projecting outwardly from an upper outer peripheral edge of the body 36. The body 36 has an inner peripheral edge defining a large central opening 40. Two diagonal ones of the corner 32B of the top plate body 36 each has a hole 42 defined therethrough which permit insertion of components of the fuel assembly handling system (not shown) for engaging the underside surface 32C of the top plate 32 in order to lift the fuel assembly 10 in installing and removing it from the core. One of the other corners 32B has a hole 44 which provides a reference for properly orientating the fuel assembly 10 in the core.

The annular rim 38 on the body 36 of the top plate 32 defines an annular cavity 46 surrounding the annular body 36 below an outer peripheral edge of the top plate 32 defined by the rim 38. The annular cavity 46 receives an upper peripheral edge portion 34A of outer sidewall enclosure 34. The top plate 32 also has a plurality of indentations 48 defined in spaced relation from one another along the periphery and underside surface 32C of the annular body 36 of the top plate 32. The indentations 48 face outwardly and downwardly of the annular body 36. Portions of the annular body 36 between the indentations 48 form downwardly protruding tabs 50 along the periphery of the body 36 for attaching the upper peripheral edge 34A of the outer sidewall enclosure 34 to the top plate 32.

Figure 9:
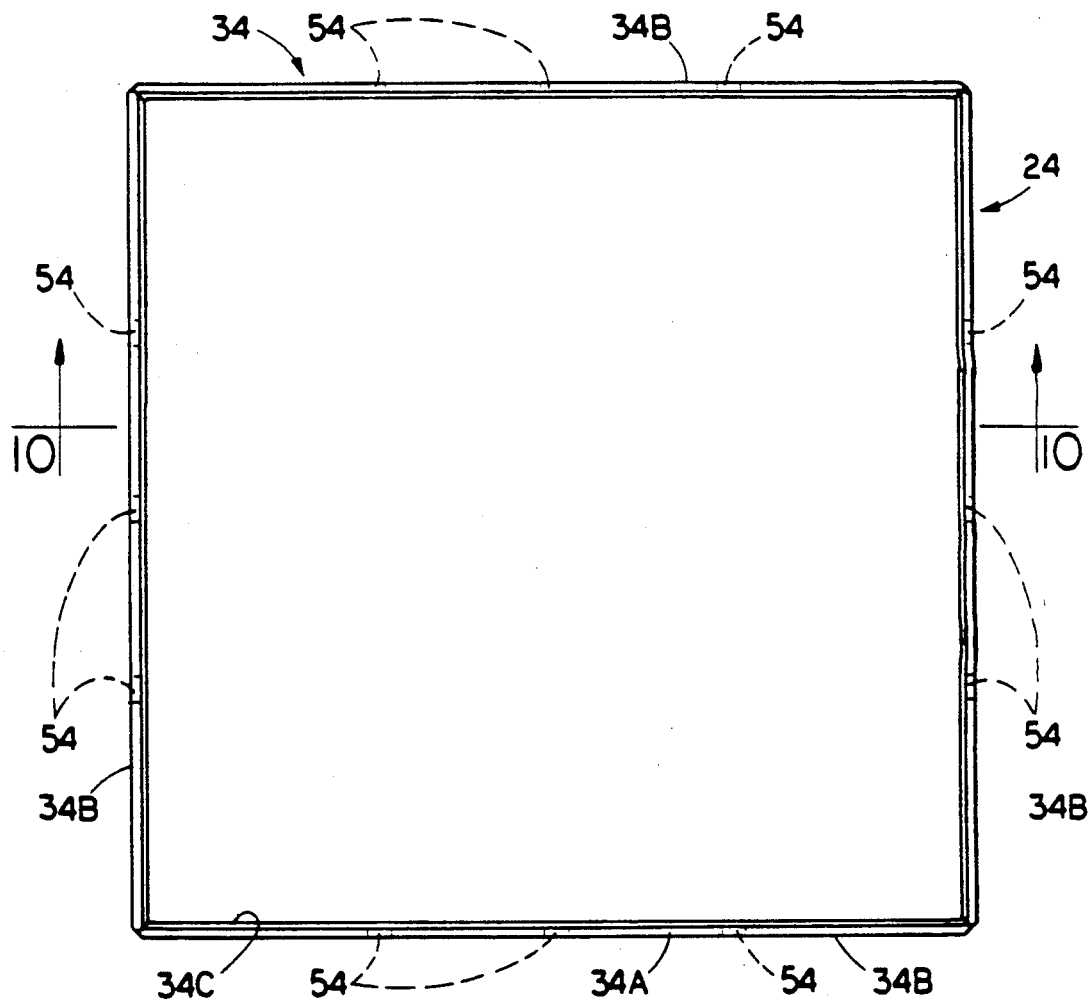
FIG. 9 is a top plan view of an outer sidewall enclosure of the upper structure of the double enclosure top nozzle subassembly of FIG. 2.
Figure 10:
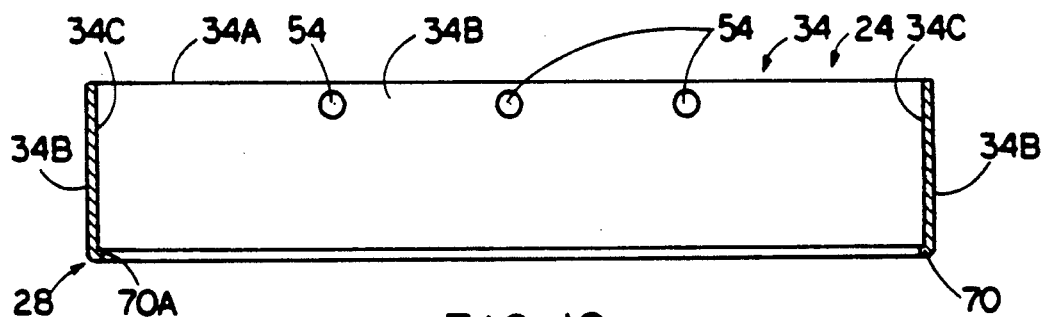
FIG. 10 is a sectional view of the outer enclosure as taken along line 10—10 of FIG. 9.
Figure 11:
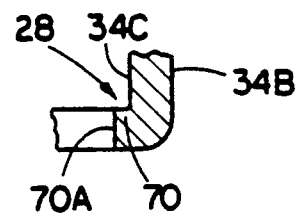
FIG. 11 is an enlarged fragmentary sectional view of the lower right portion of the outer enclosure as shown in FIG. 10.
Figure 19:
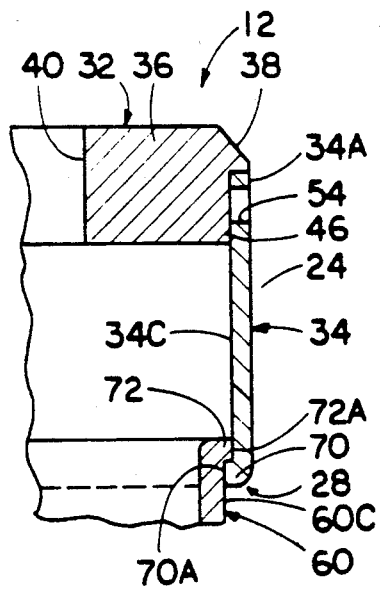
FIG. 19 is an enlarged fragmentary sectional view of the top nozzle subassembly after installation of the top plate on the upper peripheral edge of the outer enclosure but before attachment thereto.
Figure 20:
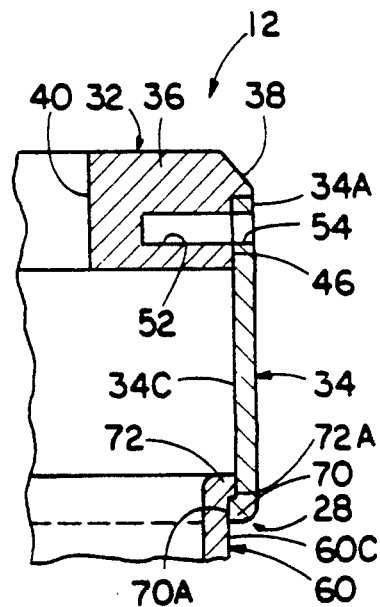
FIG. 20 is an enlarged fragmentary sectional view of the top nozzle subassembly after drilling of a hole part of the way through the top plate periphery in alignment with the hole in the outer enclosure.
Figure 21:
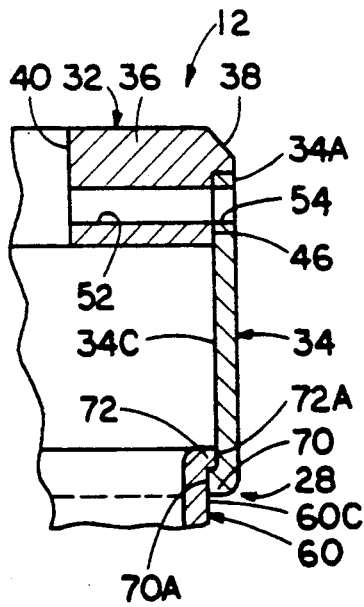
FIG. 21 is an enlarged fragmentary sectional view of the top nozzle subassembly after drilling of a hole completely through the top plate periphery in alignment with the hole in the outer enclosure.
Figure 22:
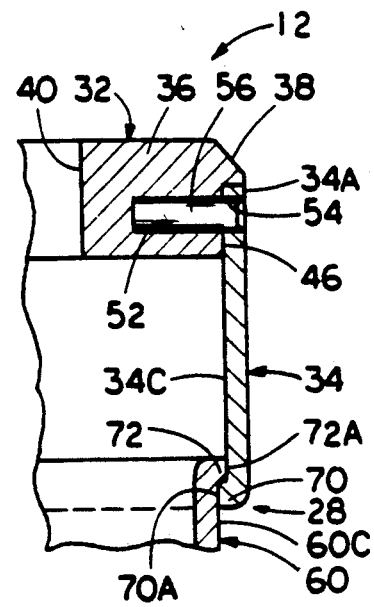
FIG. 22 is an enlarged fragmentary sectional view of the top nozzle subassembly after installation of the attachment pin through the aligned holes of the top plate periphery and outer enclosure.

Referring to FIGS. 9 and 10, the outer sidewall enclosure 34 of the upper structure 24 is composed of four generally planar vertical wall portions 34B rigidly interconnected together at their opposite vertical edges to define the outer enclosure 34 in a generally square box-like configuration. As shown in FIGS. 19-22, a series of aligned holes 52, 54 are formed in the annular body 36 below the rim 38 and in the upper peripheral edge portion 34A of the outer sidewall enclosure 34. Pins 56 are inserted through the aligned holes 52, 54 for securing the outer sidewall enclosure 34 and the annular body 36 together. The holes 52 in the annular body 36 can either extend partially into the body 36 as shown in FIG. 20 and complete through the body 36 as shown in FIG. 21.

Figure 15:
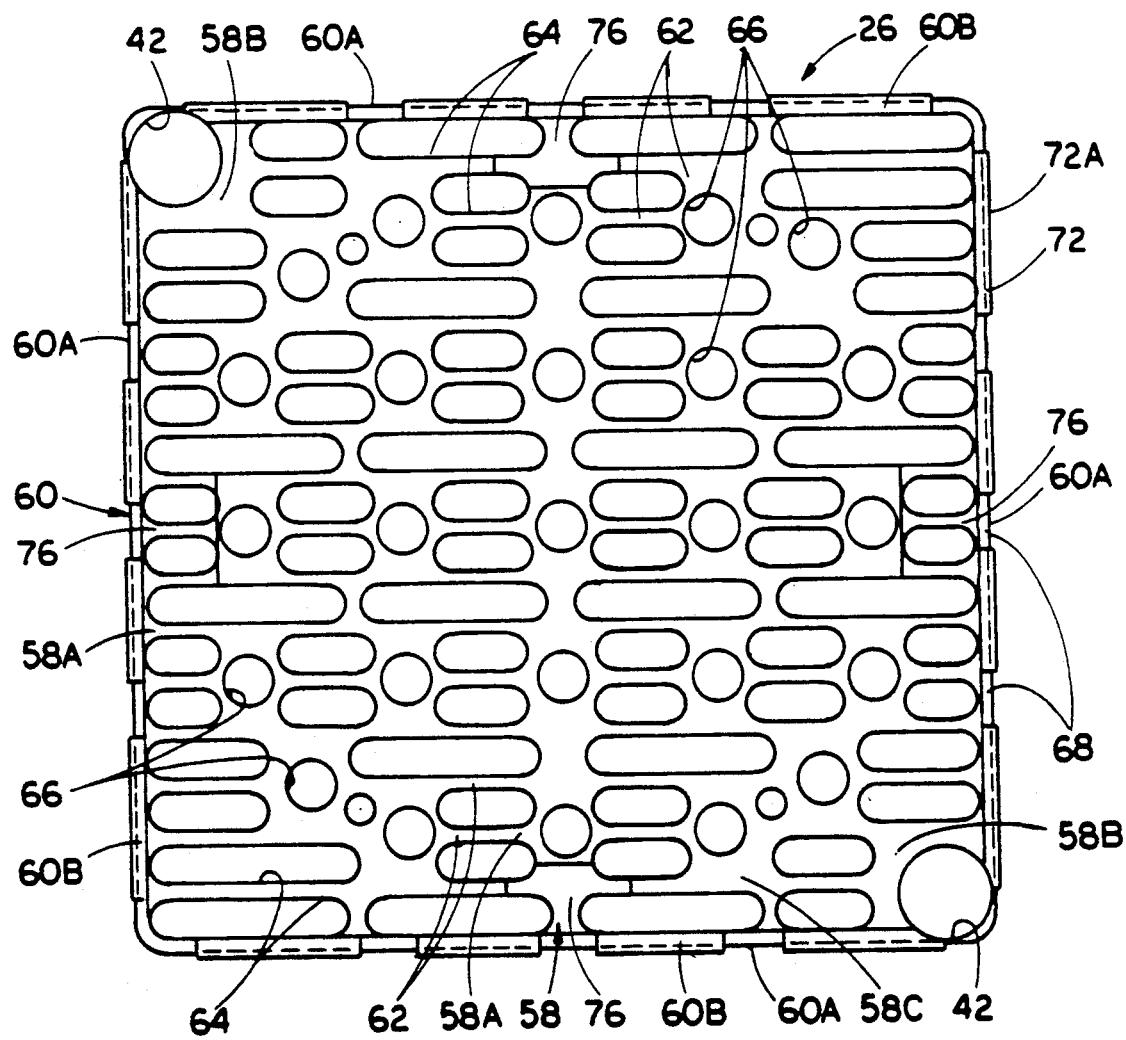
FIG. 15 is a view similar to that of FIG. 12 but showing the lower adapter plate with the guide thimble and instrumentation tube mounting holes and the coolant flow holes formed in the lower adapter plate.

As shown alone and in greater detail in FIGS. 12-15, the lower structure 26 of the top nozzle subassembly 12 is composed of a lower adapter plate 58 and an inner sidewall enclosure 60 rigidly connected to and upstanding from the lower adapter plate 58. Referring to FIG. 15, the lower adapter plate 58 is generally rectangular in configuration having four sides 58A defining four corners 58B. The lower adapter plate 58 is formed of a plurality of cross-laced ligaments or bars 62 defining a plurality of coolant flow openings 64 of oblong shapes. Also, a plurality of circular through holes 66 corresponding in number and pattern to that of the guide thimbles 16 are provided through the adapter plate 58. The through holes 66 are of sufficient dimensional size to permit the adapter plate 58 to be installed over the upper ends of the guide thimbles 16.

Referring to FIGS. 12 and 13, the inner sidewall enclosure 60 of the lower structure 26 is composed of four generally planar vertical wall portions 60A rigidly interconnected together at their opposite vertical edges to define the inner enclosure 60 in a generally square box-like configuration and integrally connected at their lower edges to the periphery of the lower adapter plate 58. The inner sidewall enclosure 60 has a plurality of upper edge portions 60B spaced apart by notches 68 defined between the upper edge portions 60B. The alternating upper edge portions 60B and the notches 68 of the inner sidewall enclosure 60 of the lower structure 26 are capable of mating respectively with the alternating indentations 48 and tabs 50 of the annular body 36 of the top plate 32 of the upper structure 24 when the top nozzle subassembly 12 is in the compressed condition, as depicted in FIG. 18. Thus, the lower adapter plate 58 of the lower structure 26 is disposed below the top plate 32 of the upper structure 24 with the inner sidewall enclosure 60 being disposed within the outer sidewall enclosure 34. Further, the inner and outer sidewall enclosures 60, 34 are movable in sliding contacting relationship relative to one another so as to permit movement of the top plate 32 toward and away from the lower adapter plate 58 and thereby the top nozzle subassembly 12 between compressed condition of FIG. 18 and the expanded condition of FIG. 17.

Referring to FIGS. 1, 9-14 and 16-22, the interengaging means 28 on respective upper and lower peripheral edge portions 60B, 34A of the inner and outer sidewall enclosures 60, 34 define stops which limit the movement of the top plate 32 and lower adapter plate 58 away from each other so as to retain the outer and inner sidewall enclosures 34, 60 in the sliding contacting relationship with one another. In addition, the interengaging means 28 define sliding contact surfaces between the outer and inner sidewall enclosures 34, 60.

The interengaging means 28 on the respective upper and lower structures 24, 26 include an inwardly-projecting continuous annular flange 70 on the lower peripheral edge of the outer sidewall enclosure 34, and an outwardly-projecting interrupted annular flange 72 on the upper edge portion of the inner sidewall enclosure 60. The inwardly-projecting flange 70 defines a contact surface 70A engaged with an exterior surface 60C of the inner sidewall enclosure 60. The outwardly-projecting flange 72 defines a contact surface 72A engaged with an interior surface 34C of the outer sidewall enclosure 34. As seen in FIGS. 1, 16, 17 and 19-22, the flanges 70, 72 provide the stops by overlapping with one another so as to prevent the outer and inner enclosures 34, 60 from pulling apart.

Figure 16:
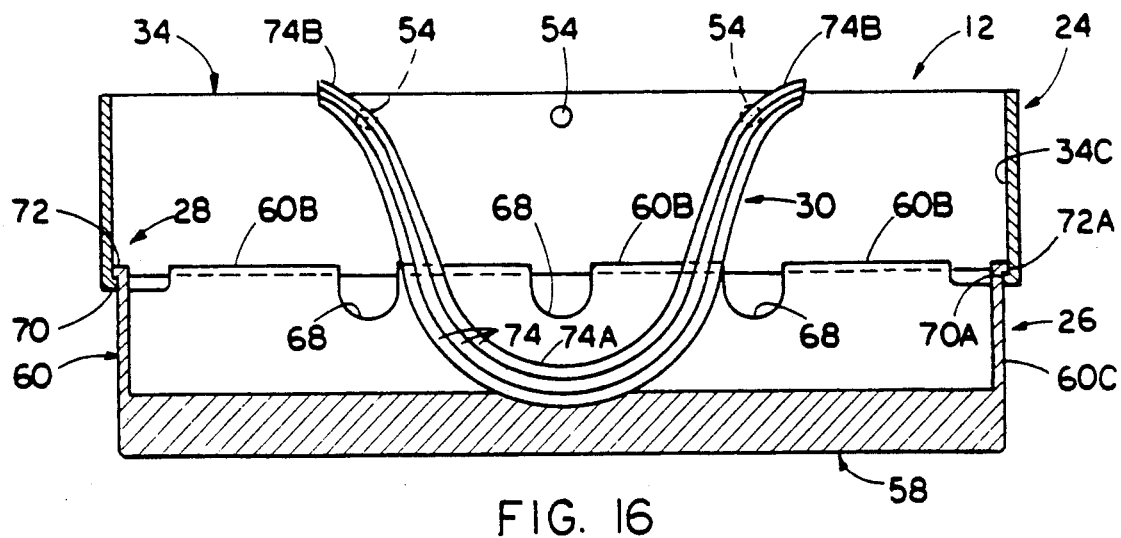
FIG. 16 is a sectional view of the double enclosure top nozzle subassembly after the leaf springs have been installed in the telescoping outer and inner enclosures but before the top plate is applied to the outer enclosure.
Figure 17:
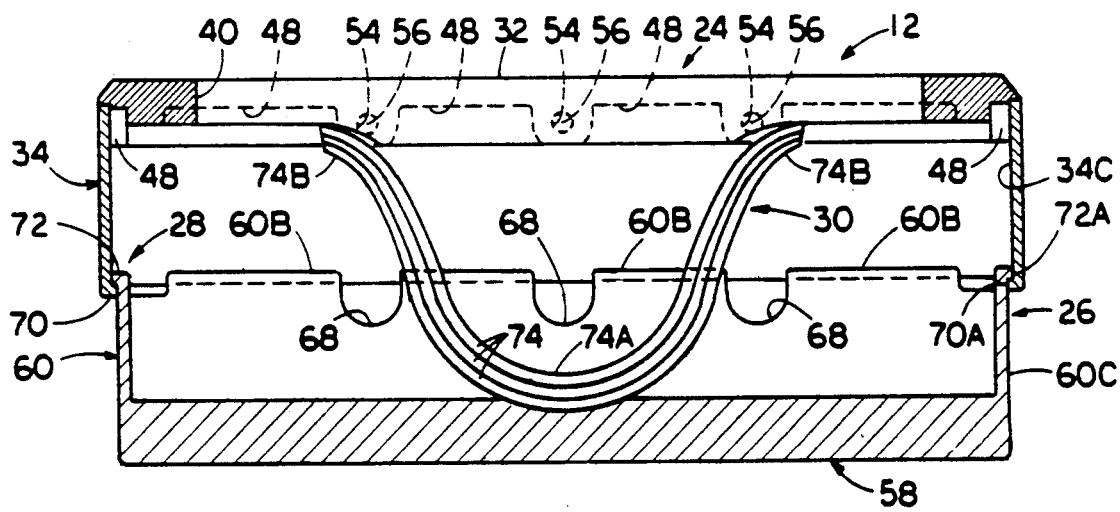
FIG. 17 is a sectional view of the double enclosure top nozzle subassembly after the top plate has been installed to the upper peripheral edge of the outer enclosure and illustrating the top nozzle subassembly disposed in an expanded condition.
Figure 18:
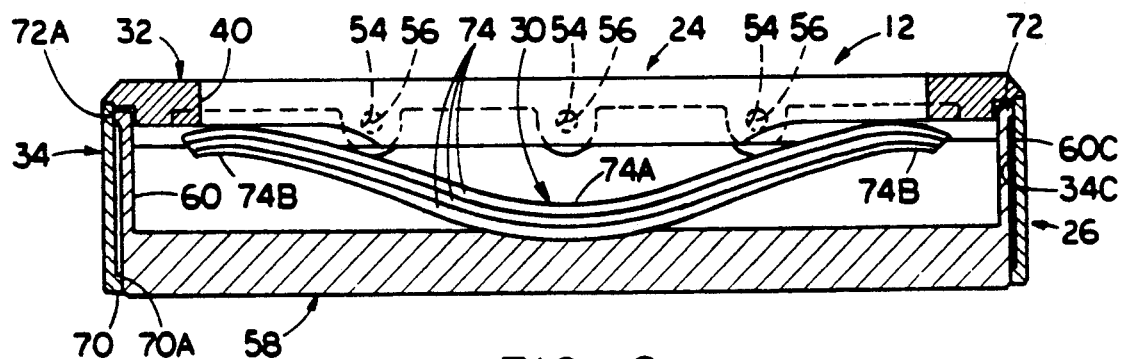
FIG. 18 is a sectional view of the double enclosure top nozzle subassembly disposed in a compressed condition.

Referring to FIGS. 1 and 16-18, there is illustrated the resiliently-yieldable biasing devices 30 disposed within the outer and inner sidewall enclosures 34, 60 and extending between and engaging the top plate 32 and the lower adapter plate 58. The devices 30 are composed of resiliently and yieldable flexible material, such as a metal material, and are movable between compressed and expanded states, as shown in FIGS. 17 and 16, in response respectively to application and removal of a hold-down force on the upper structure 24 in the direction of the lower structure 26 for respectively permitting and causing movement of the top nozzle subassembly 12 between compressed and expanded conditions.

More particularly, preferably the biasing devices 30 are a plurality of leaf springs 74 arranged in separate stacks thereof and disposed between the top plate 32 and the lower adapter plate 58 and flexible between expanded and compressed states. The lower adapter plate 58 has a depression 76 formed in a topside surface 58C of the lower adapter plate along each of the sides 58A and approximately midway between the corners 58B thereof. The top plate 32 has a pair of elongated guide grooves 78 defined in the underside surface 32C of the top plate 32 along each of the sides 32A and adjacent the corners 32B thereof. The leaf springs 74 each has a generally U-shaped configuration composed of a lower bight portion 74A and upper end portions 74B connected to and extending upwardly from the lower bight portion 74A. Each leaf spring 74 is seated at the lower bight portion 74A within one of the depressions 76 of the lower adapter plate 58 and at the opposite upper end portions 74B within the guide grooves 78 of the top plate 32.

It should be realized, however, that other forms of the biasing devices 30 can be used, such as elongated coil springs. The coil springs would be mounted between the top plate 32 and the lower adapter plate 58 in the same way as illustrated and described in the patent application cross-referenced above, the disclosure of which is incorporated herein by reference.

FIGS. 16 and 17 depict successive stages in the assembly of the double enclosure top nozzle subassembly 12. FIG. 16 shows the top nozzle subassembly 12 after the leaf springs 74 have been installed in the telescoping outer and inner enclosures 34, 60, but before the top plate 32 is applied and secured to the outer enclosure 34. FIG. 17 shows the top nozzle subassembly 12 after the top plate 32 and pins 56 has been installed to secure the top plate to the upper peripheral edge portion 34A of the outer enclosure 34. FIGS. 19-21 depict successive stages in the installation and securement of the top plate 32 and pins 56 to the upper peripheral edge portion 34A of the outer enclosure 34.

In summary, FIG. 17 shows the top nozzle subassembly 12 in an expanded condition, whereas FIG. 18 shows it in a compressed condition. In both conditions of the top nozzle subassembly 12, the lower adapter plate 58 is stationarily secured in the same position on the upper ends of the guide thimbles 16 in a conventional manner by locking tubes 80. By way of example, the lower adapter plate 58 is disposed approximately 1 inch to 1.5 inches higher above the upper ends of the fuel rods 18 than is a conventional adapter plate heretofore. Also, the inner sidewall enclosure 58 is slidably movably mounted within the interior of the outer sidewall enclosure 34. The overlapping flanges 70, 72 provide stops which prevent separation of the upper structure 24 from the lower structure 26.

To place the top nozzle subassembly 12 in the expanded condition seen in FIG. 17, the upper core support plate (not shown) is removed from imposing a downward bearing contact force upon the top plate 32 of the upper structure 24 of the top nozzle subassembly. The leaf springs 74 are thus allowed to assume their unflexed, or expanded, states in which they force the upper structure 24 away from the lower structure 26 to the limit defined by engagement between the flanges 70, 72. The lower adapter plate 58 and top plate 32 are now spaced their maximum distance apart and provide sufficient space between them for insertion of the components of the fuel assembly handling system through the corner holes 42 in the top plate 32.

To place the top nozzle subassembly 12 in the compressed condition seen in FIG. 18, the upper core support plate is installed upon the top plate 32 of the upper structure 24 of the top nozzle subassembly so as to reimpose the downward bearing contact force thereon. The top plate 32 is thus moved downward toward the lower adapter plate 58 forcing the leaf springs 60 to their flexed, or compressed, states and slidably moving the outer sidewall enclosure 34 downwardly along and relative to the inner sidewall enclosure 60 and moving the flanges 70, 72 away from one another. The space between the top plate 32 and the adapter plate 58 is now reduced below that needed for insertion of the components of the fuel assembly handling system. This does not matter since the fuel assembly is never handled by the system while it is in the core with the upper core support plate placed on the top nozzle subassembly. Thus, the extra or "dead" space previously existing between the top plate 32 and adapter plate 58 has now been eliminated and is instead now being utilized by the higher mounting position of the adapter plate 58 on the guide thimbles 16 permitting greater distance between the adapter plate 58 and upper ends of the fuel rods 18 for increased thermal growth and greater burnup of the fuel rods in the core. Later when the fuel assembly 10 is to be handled, the upper core plate is removed and the leaf springs 74 moves the upper structure 24 upward to its position in FIG. 17 returning the top plate 32 and adapter plate 58 to their maximum spacing for providing the necessary space therebetween for the fuel assembly handling system components.

The lower peripheral edge portion of the upper structure 24 does not move downwardly past the lower adapter plate 58 and so any possible fretting of the fuel rods 18 is eliminated. The central opening 40 of the top plate 32 accommodates passage of control rods (not shown) into the guide thimbles 16 in a conventional manner. The leaf springs 74 transmit the necessary holddown force from the upper core plate directly to the adapter plate 58. It will be noted also that the telescoping outer and inner sidewall enclosures 34, 60 of the upper and lower structures 24, 26 completely enclose the leaf springs 74 in both expanded and compressed conditions of the top nozzle subassembly 12, thus protecting and shielding the springs from imposition of lateral forces thereon by coolant flow.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A double enclosure top nozzle subassembly for a nuclear fuel assembly, said top nozzle subassembly comprising:

(a) an upper structure including a top plate and an outer sidewall enclosure rigidly connected to and depending from an outer peripheral edge of said top plate;

(b) a lower structure including a lower adaptor plate and an inner sidewall enclosure rigidly connected to and upstanding from an outer peripheral edge of said lower plate, said lower adapter plate being disposed below said top plate, said inner sidewall enclosure being disposed within said outer sidewall enclosure, said inner and outer sidewall enclosures being movable in sliding contacting relationship relative to one another so as to permit movement of said top plate toward and away from said lower adapter plate;

(c) interengaging means on respective upper and lower peripheral edges of said inner and outer sidewall enclosures for defining stops which limit the movement of said top plate and lower adaptor plate away from each other so as to retain said outer and inner sidewall enclosures in said sliding contacting relationship with one another and prevent movement of said lower peripheral edge of said outer sidewall enclosure below said lower adaptor plate, said interengaging means on said respective upper and lower peripheral edges of said inner and outer sidewall enclosures also defining sliding surfaces between said inner and outer sidewall enclosures being maintained in continuous contact with one another as said top plate and lower adapter plate move toward and away from one another; and (d) a plurality of resiliently-yieldable biasing devices disposed within said inner and outer sidewall enclosures and extending between and engaging said top plate and said lower adapter plate, said devices being movable between compressed and expanded states in response respectively to application and removal of a hold-down force on said upper structure in the direction of said lower structure for respectively permitting and causing movement of said inner and outer sidewall enclosures relative to one another and said top plate toward and away from said lower adapter plate and thereby said top nozzle subassembly between compressed and expanded conditions.

2. The top nozzle subassembly as recited in claim 1, wherein said interengaging means includes:
an inwardly-projecting flange on said lower edge of the outer sidewall enclosure defining a contact surface engaged with an exterior surface of said inner sidewall enclosure; and
an outwardly-projecting flange on said upper edge of said inner sidewall enclosure defining a contact surface engaged with an interior surface of said outer sidewall enclosure, said flanges overlapping with one another to define said stops.

3. The top nozzle subassembly as recited in claim 1, wherein said top plate of said upper structure includes an annular body.

4. The top nozzle subassembly as recited in claim 3, where said outer peripheral edge of said top plate is defined by a rim projecting outwardly from an upper peripheral edge of said annular body so as to define an annular cavity surrounding said annular body for receiving an upper peripheral edge of said outer sidewall enclosure.

5. The top nozzle subassembly as recited in claim 3, wherein said top plate includes a plurality of indentations defined along the periphery and underside of said annular body in spaced relation to one another, said indentations facing outwardly of said body and downwardly therefrom, the portions of said annular body between said indentations forming downwardly protruding tabs along the periphery of said body for attaching said top plate to an upper peripheral edge of said outer sidewall enclosure.

6. The top nozzle subassembly as recited in claim 5, wherein said top plate further includes a plurality of pins inserted through said upper peripheral edge of said outer sidewall enclosure and said tabs of said annular body for securing said outer sidewall enclosure and said annular body together.

7. The top nozzle subassembly as recited in claim 5, wherein said inner sidewall enclosure of said lower structure has a plurality of upper edge portions spaced apart by notches defined between said upper edge portions, said upper edge portions and said notches being capable of mating respectively with said spaced indentations and tabs in said annular body of said top plate of said upper structure when said top nozzle subassembly is in said compressed condition.

8. The top nozzle subassembly as recited in claim 1, wherein said top plate of said upper structure and said lower adapter plate of said lower structure are generally rectangular in configuration having four sides defining four corners.

9. The top nozzle subassembly as recited in claim 8, wherein said biasing devices are a plurality of leaf springs disposed between said top plate and said lower adapter plate and movable between expanded and compressed states.

10. The top nozzle subassembly as recited in claim 9, wherein:
said lower adapter plate has a depression formed in a topside of said lower adapter plate along each of said sides and approximately midway between said corners thereof;
said top plate has a pair of guide grooves defined in the underside of said top plate along each side and adjacent said corners thereof; and
each of said leaf springs has a generally U-shaped configuration composed of a lower bight portion and upper end portions connected to and extending upwardly from said lower bight portion, said leaf spring being seated at said lower bight portion within one of said depressions of said lower adapter plate and at said opposite upper end portions within said guide grooves of said top plate.

11. The top nozzle subassembly as recited in claim 1, wherein each of said outer and inner sidewall enclosures of said upper and lower structures is composed of generally planar pairs of vertical wall portions rigidly interconnected together at their opposite vertical edges.

12. In a nuclear fuel assembly including a bottom nozzle, a plurality of guide thimbles having upper and lower ends and being attached at said lower ends to said bottom nozzle and extending upwardly therefrom, an array of upstanding fuel rods extending along and spaced from said guide thimbles and spaced at their lower ends above said bottom nozzle, and a plurality of support grids axially spaced along and connected to said guide thimbles for supporting said array of upstanding fuel rods, a double enclosure top nozzle subassembly which permits increased fuel rod thermal growth and burnup, said top nozzle subassembly comprising:
(a) an upper structure including a top plate and an outer sidewall enclosure rigidly connected to and depending from an outer peripheral edge of the top plate;
(b) a lower structure including a lower adapter plate and an inner sidewall enclosure rigidly connected to and upstanding from an outer peripheral edge of said lower adapter plate, said lower adapter plate being disposed below said top plate, said inner sidewall enclosure being disposed below said top plate, said sidewall enclosure, said inner and outer sidewall enclosures being movable in sliding contacting relationship relative to one another so as to permit movement said top plate toward and away from said lower adapter plate;
(c) interengaging means on respective upper and lower peripheral edges of said inner and outer sidewall enclosures for defining stops which limit the movement of said top plate and lower adapter plate away from each other so as to retain said outer and inner sidewall enclosures in said sliding contacting relationship with one another and prevent movement of said lower peripheral edge of said outer sidewall enclosure to below said lower adapter plate, said interengaging means on said respective upper and lower peripheral edges of said inner and outer sidewall enclosures also defining sliding surfaces between said inner and outer sidewall enclosures being maintained in continuous contact with one another as said top plate and lower adapter plate move toward and away from one another; and
(d) a plurality of resiliently-yieldable biasing devices disposed within said inner and outer sidewall enclosures and extending between and engaging said top plate and the lower adapter plate, said devices being movable between compressed and expanded states in response respectively to application and removal of a hold-down force on said upper structure in the direction of said lower structure for respectively permitting and causing movement of said inner and outer sidewall enclosures relative to one another so as to move said top plate toward and away from said lower adapter plate and thereby said top nozzle subassembly between compressed and expanded conditions.

13. The top nozzle subassembly as recited in claim 12, wherein said interengaging means includes:
an inwardly-projecting flange on said lower edge of the outer sidewall enclosure defining a contact surface engaged with an exterior surface of said inner sidewall enclosure; and
an outwardly-projecting flange is an inwardly-projecting flange on said upper edge of said inner sidewall enclosure defining a contact surface engaged with an interior surface of said outer sidewall enclosure, said flanges overlapping with one another to define said stops.

14. The top nozzle subassembly as recited in claim 12, wherein said top plate of said upper structure includes an annular body having an inner peripheral edge defining a large central opening and aligned above said outer perimeter of said guide thimbles.

15. The top nozzle subassembly as recited in claim 16, where said outer peripheral edge of said top plate is defined by a rim projecting outwardly from an upper peripheral edge of said annular body so as to define an annular cavity surrounding said annular body for receiving an upper peripheral edge of said outer sidewall enclosure.

16. The top nozzle subassembly as recited in claim 14, wherein said top plate includes a plurality of indentations defined along the periphery and underside of said annular body in spaced relation to one another, said indentations facing outwardly of said body and downwardly therefrom, the portions of said annular body between said indentations forming downwardly protruding tabs along the periphery of said body for attaching said top plate to an upper peripheral edge of said outer sidewall enclosure.

17. The top nozzle subassembly as recited in claim 16, wherein said top plate further includes a plurality of pins inserted through said upper peripheral edge of said outer sidewall enclosure and said tabs of said annular body for securing said outer sidewall enclosure and said annular body together.

18. The top nozzle subassembly as recited in claim 16, wherein said inner sidewall enclosure of said lower structure has a plurality of upper edge portions spaced apart by notches defined between said upper edge portions, said upper edge portions and said notches being capable of mating respectively with said spaced indentations and tabs in said annular body of said top plate of said upper structure when said top nozzle subassembly is in said compressed condition.

19. The top nozzle subassembly as recited in claim 12, wherein said top plate of said upper structure and said lower adapter plate of said lower structure are generally rectangular in configuration having four sides defining four corners.

20. The top nozzle subassembly as recited in claim 19, wherein said biasing devices are a plurality of leaf springs disposed between said top plate and said lower adapter plate and movable between expanded and compressed states.

21. The top nozzle subassembly as recited in claim 20, wherein:
said lower adapter plate has a depression formed in a topside of said lower adapter plate along each of said sides and approximately midway between said corners thereof;
said top plate has a pair of guide grooves defined in the underside of said top plate along each side and adjacent said corners thereof; and
each of said leaf springs has a generally U-shaped configuration composed of a lower bight portion and upper end portions connected to and extending upwardly from said lower bight portion, said leaf spring being seated at said lower bight portion within one of said depressions of said lower adapter plate and at said opposite upper end portions within said guide grooves of said top plate.

22. The top nozzle subassembly as recited in claim 12, wherein each of said outer and inner sidewall enclosures of said upper and lower structures is composed of generally planar pairs of vertical wall portions rigidly interconnected together at their opposite vertical edges.

* * * * *